3,256,331
**PROCESS FOR PREPARING OXIMES, HYDRA-
ZONES AND SEMICARBAZONES OF UNRE-
ACTIVE CARBONYL COMPOUNDS**
William H. Jones, Metuchen, and Edward W. Tristram,
Cranford, N.J., assignors to Merck & Co., Inc., Rahway, N.J., a corporation of New Jersey
No Drawing. Application July 28, 1959, Ser. No.
829,989, which is a division of application Ser. No.
646,520, Mar. 18, 1957. Divided and this application
Apr. 24, 1963, Ser. No. 275,227
4 Claims. (Cl. 260—566)

This application is a division of our copending application Serial No. 829,989 filed July 28, 1959, and now abandoned, which is in turn a division of copending application Serial No. 646,520 filed March 18, 1957, and now abandoned.

This invention relates to a novel process for the preparation of unsaturated nitrogenous derivatives of carbonyl compounds and to the novel products thus obtained.

The carbonyl group is characterized by unsaturation and ability to add a great variety of reagents. This ability is modified, however, by the groups attached to the carbonyl. Thus the methyl ketones containing the grouping $CH_3CO$ are more reactive than those which contain two larger groups. Branching of the groups, especially near the carbonyl, has a profound effect on the activity of that group. For example, 2,4-dimethyl-3-pentanone is much less reactive than acetone. When the groups next to the carbonyl group are further substituted by methyl groups as in 2,2,4,4-tetramethyl-3-pentanone, the carbonyl group becomes completely unreactive toward such reagents as hydroxylamine, semicarbazide, hydrazine, etc. under any of the usual conditions for reaction with such reagents. This invention is directed to the introduction of a nitrogen atom into just such unreactive compounds.

It is an object of this invention to provide a procedure for introducing a nitrogen atom in place of the oxygen atom of the carbonyl group where such carbonyl group is generally unreactive.

The novel unsaturated nitrogenous derivatives of carbonyl compounds produced in accordance with this invention have been found to serve a variety of useful purposes. The oxime derivatives are useful flotation agents, photographic sensitizers and rubber vulcanization agents. The hydrazone derivatives are useful intermediates for making pyrazolone dyes and wetting agents. The semicarbazones possess insecticidal activity. The amino derivatives obtained from the oximes have been found to possess ganglionic blocking activity. The steroid derivatives may be converted to compounds having cortisone-like activity.

Regarded in certain of its broader aspects, the process in accordance with the present invention involves reacting a compound having an unreactive carbonyl group with a nitrogenous carbonyl addition reagent under elevated pressure to form the unsaturated nitrogenous derivative of said carbonyl compound. Although the examples set forth in this invention describe a batchwise operation, the process may be carried out in a continuous manner by suitable modifications of the apparatus. If desired, the nitrogenous-containing product can then be reduced by chemical reducing agents or by catalytic hydrogenation to the corresponding saturated nitrogenous compound which may be an amine, substituted hydrazine, etc., depending on the nature of the unsaturated nitrogenous derivative. The catalytic hydrogenation may likewise be carried out in either a batchwise or continuous manner.

In general, it may be said that the process in accordance with the present invention can be applied to any type of carbonyl compound, but it finds its novel and most useful application in effecting the reaction of unreactive carbonyl compounds. By the term "unreactive carbonyl compound" is meant compounds whose carbonyl groups are especially unreactive as a result of electronic or steric hindrance effects or combinations of these effects.

The carbonyl groups which are especially unreactive may be determined by a color test described in Shriner, Fuson, Curtin "The Systematic Identification of Organic Compounds," Fourth Edition, page 119, 1956, John Wiley & Sons, Inc., New York. A brief description of this test is given below.

The reagent used in this test is prepared by adding 3 ml. of Bogen or Grammercy Universal Indicator to a solution of 5 grams of hydroxylamine hydrochloride in 1 ml. of 95% ethanol. The color of the solution is adjusted to a bright orange shade (pH 3.7 to 3.9) by adding dilute (5%) ethanolic sodium hydroxide solution dropwise. The test involves adding to one ml. of this reagent a drop or few crystals of the carbonyl compound. If there is no color change an unreactive carbonyl group is present. The above references describe a modification which is used for acidic or basic compounds.

The compounds which may be employed in the present process include the aliphatic saturated ketones where both α-carbon atoms are each attached to at least two other carbon atoms or groups other than hydrogen as in 2,2,4,4-tetramethyl-3-pentanone; aliphatic unsaturated ketones where both α-carbon atoms are each attached to at least two groups other than hydrogen except that when one of the α-carbon atoms is part of the unsaturated grouping it must be attached to one other group other than hydrogen such as 2,4,4-trimethyl-1-penten-3-one; aliphatic diketones in which all carbon atoms attached to the carbonyl groups are substituted by at least two groups other than hydrogen as in 2,4,4,6-tetramethyl-3,5-heptanedione; cyclic ketones in which both carbon atoms attached to the carbonyl groups are each substituted by at least one group other than hydrogen such as 2,5-dimethylcyclopentanone, and polycyclic ketones whose carbonyl groups are particularly unreactive by virtue of the steric arrangement of the ring system and attached groups such as 22-ergosten-3β-ol-11-one; aromatic ketones in which at least three of the ortho positions of the aromatic rings are substituted by groups other than hydrogen such as 2,6-dimethyl-2'-bromo-6'-nitrobenzophenone; mixed aromatic-aliphatic ketones in which at least one of the ortho positions of the ring is substituted by a group other than hydrogen and the α-carbon of the aliphatic portion holds at least two groups other than hydrogen such as α,α-dimethyl-2-nitropropiophenone; and 1,4-benzoquinones in which at least three of the carbon atoms attached to carbonyl groups are substituted by groups other than hydrogen.

This invention also relates to unreactive aldehydes such as 2,4-dinitrobenzaldehyde and 1,3-dinitro-2-naphthaldehyde.

By nitrogenous carbonyl addition reagent is meant compounds such as hydroxylamine, methoxylamine, aniline, benzylamine, ammonia, hydrazine, phenylhydrazine, semicarbazide and thiosemicarbazide, which react by addition to the carbonyl group followed by elimination of water to form the unsaturated nitrogenous carbonyl derivative.

In accordance with one method of carrying out the present invention, sodium acetate trihydrate and hydroxylamine hydrochloride are dissolved separately in minimum amounts of water at room temperature. The solutions are mixed and diluted with ethanol and the sodium chloride which precipitates is removed. Thus, this procedure provides free hydroxylamine in a buffered solution. A ketone such as 2,2,4,4-tetramethyl-3-pentanone is dissolved in the hydroxylamine solution by dilution with ethanol. The reaction mixture is then compressed hydraulically to at least 50,000 p.s.i. The temperature of the reaction can range between room temperature and about 250° C. The pressure is released and the white crystalline 2,2,4,4-tetramethyl-3-pentanone oxime is filtered and washed with water. The 2,2,4,4-tetramethyl-3-pentanone oxime thus obtained can be used as a flotation agent, photographic sensitizer or rubber vulcanization agent.

The 2,2,4,4-tetramethyl-3-pentanone oxime can then be hydrogenated in the presence of a hydrogenation catalyst such as platinum oxide or palladium to form 3-amino-2,2,4,4-tetramethylpentane.

The following examples are intended to be illustrative only and may be varied or modified without departing from the spirit and scope of this invention.

EXAMPLE 1

*Preparation of 2,2,4,4-tetramethyl-3-pentanone oxime*

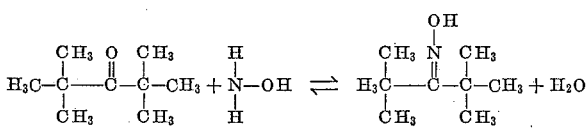

5.4 grams of sodium acetate trihydrate and 2.2 grams of hydroxylamine hydrochloride were dissolved separately in minimum amounts of water at room temperature. The two solutions were then mixed and diluted to about 40 ml. with absolute ethanol. The precipitate of sodium chloride was removed by filtration. Then 3.0 grams of 2,2,4,4-tetramethyl-3-pentanone was dissolved in the above filtrate and the total volume of solution was brought to 50 ml. with absolute ethanol. This solution was transferred to a compressible stainless steel sample holder which was placed in a high pressure reaction vessel. The reaction mixture was then compressed hydraulically to a pressure of 125,000 p.s.i. at room temperature. The temperature was raised to 75° C. at which point the pressure had increased to 136,000 p.s.i. These reaction conditions were maintained for a period of 20 hours. The reactor was cooled to room temperature and the pressure was then released. The sample holder was opened and the white crystalline 2,2,4,4-tetramethyl-3-pentanone oxime was filtered and washed thoroughly with water. Removal of the ethanol from the filtrate by concentration in vacuo gave an additional small crop of crystalline product. The total weight of product was 2.3 g., M.P. 156.5–158.5° C.

*Reduction of 2,2,4,4-tetramethyl-3-pentanone oxime to 3-amino-2,2,4,4-tetramethylpentane*

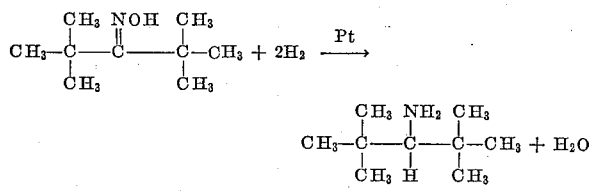

0.5 gram of 2,2,4,4-tetramethyl-3-pentanone oxime prepared as described above was dissolved in 15 ml. of glacial acetic acid and reduced in the presence of 0.25 gram of platinum oxide at room temperature and an initial hydrogen pressure of 42 p.s.i. The reduction was allowed to proceed for about 15 hours during which time the theoretical amount of hydrogen was absorbed. Then the catalyst was removed by filtration. To the filtrate was added 0.5 ml. of concentrated hydrochloric acid, and the mixture was concentrated to dryness in vacuo. The white crystalline residue of 3-amino-2,2,4,4-tetramethylpentane hydrochloride was recrystallized from an ethanol-ether mixture. The material melts with decomposition over a wide temperature range starting at 260° C.

Analysis:

|  | Percent C | Percent H | Percent N |
|---|---|---|---|
| Calculated for $C_9H_{21}N \cdot HCl$ | 60.14 | 12.34 | 7.80 |
| Found | 60.47 | 12.54 | 7.69 |

The 3-amino-2,2,4,4-tetramethylpentane hydrochloride produced in accordance with the above procedure possesses a relatively high order of ganglionic blocking activity.

EXAMPLE 2

*Preparation of 2,2,3,3,5,5,6-heptamethyl-4-heptanone semicarbazone*

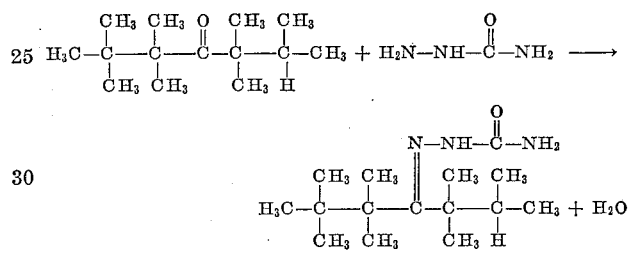

4.1 grams of sodium acetate trihydrate and 2.2 grams of semicarbazide hydrochloride were dissolved separately in minimum amounts of water at room temperature. The two solutions were then mixed and diluted to about 40 ml. with absolute ethanol. The precipitate of sodium chloride was removed by filtration. Then 2.1 grams of 2,2,3,3,5,5,6-heptamethyl-4-heptanone was dissolved in the above filtrate and the total volume was brought to 50 ml. with absolute ethanol. The reaction mixture was then placed in a sample holder and compressed for 24 hours at 140,000 p.s.i. pressure at 100° C. The reaction mixture was removed from the pressure vessel and concentrated in vacuo to remove most of the ethanol. The residue was diluted with water and the desired white crystalline 2,2,3,3,5,5,6-heptamethyl-4-heptanone semicarbazone was collected on a filter.

EXAMPLE 3

*Preparation of 3,5-dichloro-2,6-dimethyl-1,4-benzoquinone dioxime*

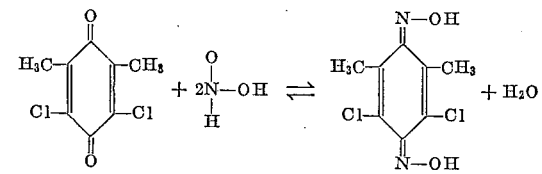

To an aqueous ethanol solution of 2.8 grams of hydroxylamine hydrochloride and 6.8 grams of sodium acetate trihydrate was added 2.1 grams of 3,5-dichloro-2,6-dimethyl-1,4-benzoquinone. The reaction mixture was compressed hydraulically to 140,000 p.s.i. pressure at a temperature of 80° C. These conditions were maintained for 12 hours. Then the ethanol was removed by concentration in vacuo and the crystalline 3,5-dichloro-2,6-dimethyl-1,4,benzoquinone dioxime was removed by filtration.

EXAMPLE 4

*Preparation of 2,2,6,6-tetramethylcyclohexanone-phenylhydrazone*

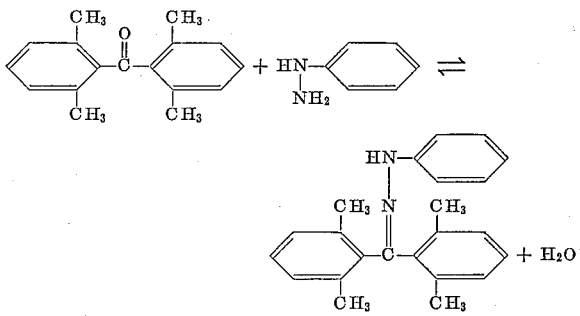

4.1 grams of sodium acetate trihydrate and 2.9 grams of phenylhydrazine hydrochloride were dissolved separately in minimum amounts of water at room temperature. The two solutions were then mixed and diluted to about 40 ml. with absolute ethanol. The precipitate of sodium chloride was removed by filtration. Then 2.4 grams of 2,2′,6,6′-tetramethylbenzophenone was dissolved in the above filtrate and the total volume of solution was brought to 50 ml. by the addition of absolute ethanol. The reaction mixture was then compressed hydraulically to a pressure of 125,000 p.s.i. at a temperature of 50° C. These conditions were maintained for 12 hours. Then the ethanol was removed by concentration in vacuo and the crystalline 2,2,′,6,6′-tetramethylbenzophenone phenylhydrazone was removed by filtration.

EXAMPLE 5

*Preparation of 2,2,6,6-tetramethylcyclohexanone-4-nitrophenylhydrazone*

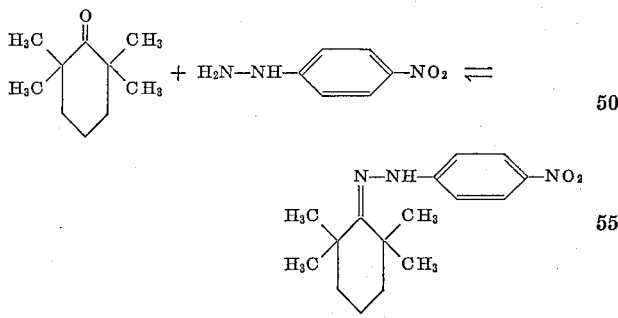

To a mixture of 30 ml. of ethanol and 0.5 ml. of glacial acetic acid was added 1.3 grams of 2,2,6,6-tetramethylcyclohexanone and 2.3 grams of 4-nitrophenylhydrazine. The mixture was diluted to a volume of about 50 ml. and transferred to a compressible sample holder. The sample holder was placed in the high pressure vessel and compressed hydraulically to a pressure of 150,000 p.s.i. at a temperature of 50° C. for a period of 8 hours. The reaction mixture was then concentrated to a small volume in vacuo and cooled in ice. The crystalline 4-nitrophenylhydrazone of 2,2,6,6 - tetramethylcyclohexanone was collected on a filter and recrystallized from a water-ethanol mixture.

*Reduction of 2,2,6,6-tetramethylcyclohexanone-4-nitrophenylhydrazone to 1-(4-aminophenyl)-2-(2,2,6,6-tetramethylcyclohexyl) hydrazine*

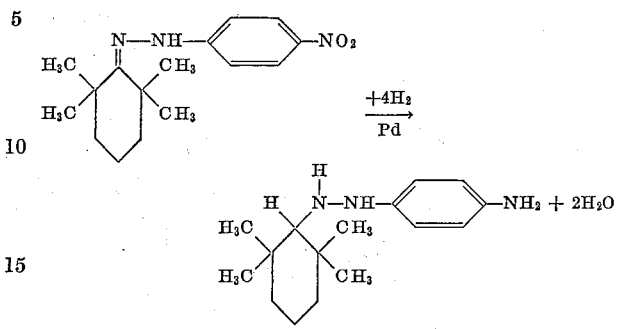

A 2.0 gram sample of the 4-nitrophenylhydrazone of 2,2,6,6-tetramethylcyclohexanone was dissolved in 50 ml. of ethanol. The mixture was hydrogenated at room temperature over 0.5 gram of a 5% palladium on carbon catalyst. The initial hydrogen pressure was 40 p.s.i. The theoretical amounts of hydrogen was absorbed in 45 minutes. The catalyst was removed by filtration and the filtrate was cooled in ice and saturated with dry hydrogen chloride. The crystalline hydrochloride of 1 - (4 - aminophenyl) - 2 - (2,2,6,6 - tetramethylcyclohexyl) hydrazine was collected on a filter and washed with ether.

EXAMPLE 6

*Preparation of 3,20-bisethylenedioxy-11-oximino-5-pregnene 17α,21-diol*

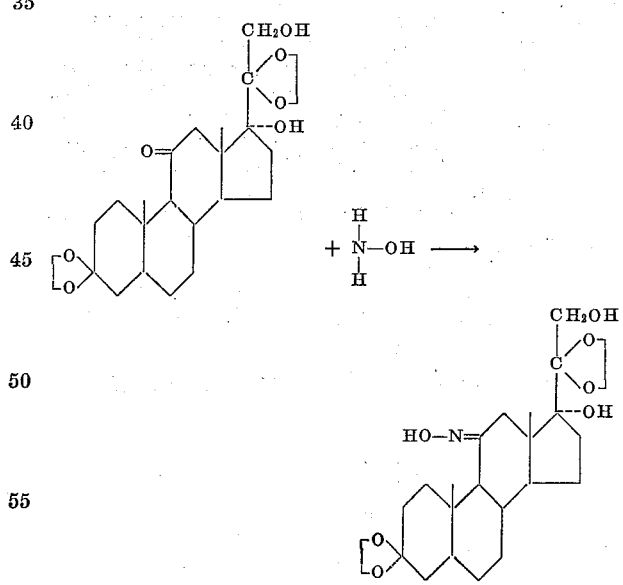

To a solution of 3.0 grams of hydroxylamine hydrochloride and 6.0 grams of sodium acetate in 15 ml. of water were added 15 ml. of ethanol and 25 ml. of pyridine. The precipitated salt was removed by filtration. 3.0 grams of 3,20-bisethylenedioxy-5-pregnene-17α,21-diol-11-one was dissolved in the filtrate and heated at 75° C. under 130,000 p.s.i. pressure for 16 hours. After cooling to room temperature, the reaction mixture was diluted with water and made alkaline with dilute sodium hydroxide. The flocculent precipitate was aged in the refrigerator for two hours, filtered, and washed with water. The crude product was recrystallized from methanol to give 1.5 grams of pure 3,20-bisethylenedioxy-11-oximino-5-pregnene-17α,21-diol, melting point 259–267° C., with decomposition. The infrared absorption spectrum showed no absorption in the carbonyl regions.

Preparation of 11-amino-3,20-bisethylenedioxy-5-pregnene-17,21-diol

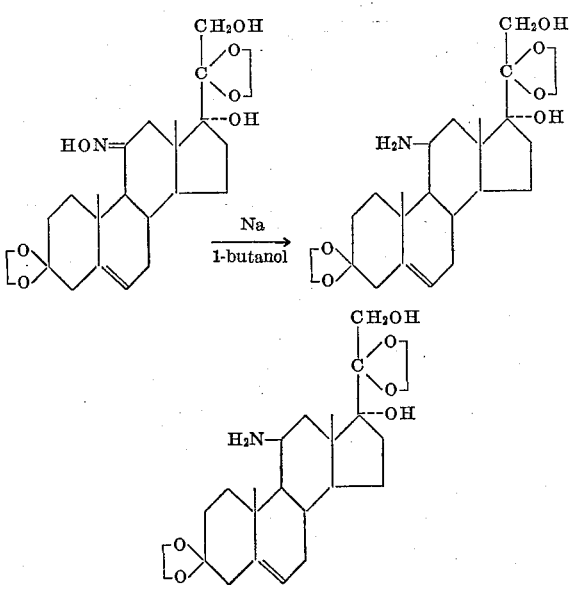

6.0 grams of sodium was added over a period of 2 hours to a refluxing solution of 1 gram of 11-oximino-3,20-bisethylenedioxy-5-pregnene-17α,21-diol in 70 ml. of 1-butanol. The reaction mixture after cooling was diluted with water and extracted with ether-butanol. The ether butanol extracts were evaporated to dryness under vacuum and triturated with ether. The ether-insoluble portion weighed 575 mg., M.P. 224–237° C. with decomposition. Recrystallization from benzene-petroleum ether gave 11β-amino-3,20-bisethylenedioxy-5-pregnene-17α,21-diol, 450 mg., M.P. 236–242° C. with decomposition.

The ether extract of the crude reaction product was concentrated to dryness in vacuum and the residue was recrystallized from benzene-petroleum ether to give 35 mg. of 11α-amino-3,20-bisethylenedioxy-5-pregnene-17α,21-diol, melting point 165–172° C.

EXAMPLE 7

*Preparation of 11-oximino-22-ergosten-3β-ol*

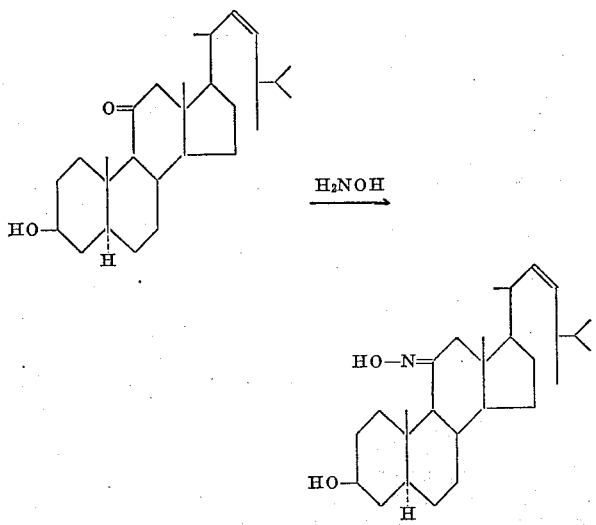

A mixture of 0.5 gram of 22-ergosten-3β-ol-11-one, 1.0 gram of hydroxylamine hydrochloride, and 2.0 grams of sodium acetate were dissolved in a mixed solvent consisting of 10 ml. water, 20 ml. ethanol, and 10 ml. pyridine. The solution at high pressure (135,000 p.s.i.) was heated at 75° C. for 18 hours. After cooling, the reaction mixture was diluted with 100 ml. of water and filtered to give crude 11-oximino-22-ergosten-3β-ol having a melting point of 175–190° C. Recrystallization from methanol gave 0.35 g. of product, M.P. 193–195° C.

EXAMPLE 8

*Preparation of 2,4-dinitrobenzaldehyde oxime*

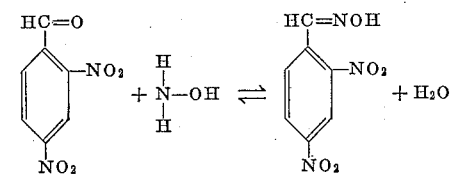

5.4 grams of sodium acetate trihydrate and 2.2 grams of hydroxylamine hydrochloride were dissolved separately in minimum amounts of water. The two solutions were then mixed and diluted to about 40 ml. with ethanol. The sodium chloride which precipitated was filtered, and 2.0 grams of 2,4-dinitrobenzaldehyde was dissolved in the filtrate. The total volume of solution was brought to 50 ml. by the addition of ethanol. This reaction mixture was then compressed hydraulically to 150,000 p.s.i. and heated at 50° C. for 12 hours. The reaction mixture was then diluted with water and concentrated in vacuo to remove most of the ethanol. The oxime of 2,4-dinitrobenzaldehyde which precipitated was collected on a filter and washed with water.

Various changes and modifications may be made in carrying out the present invention without departing from the spirit and scope thereof. Insofar as these changes and modifications are within the purview of the annexed claims they are to be considered as part of this invention.

What is claimed is:

1. The process comprising reacting a compound selected from the group consisting of aldehydes and ketones containing an unreactive carbonyl group, which compound demonstrates an absence of color change when a small portion of said compound is treated with 1 ml. of a test solution of 3 mls. of a Bogen Universal Indicator in a solution of 5 gms. of hydroxylamine hydrochloride in 1 ml. of 95% ethanol, which test solution has prior to the treatment of said compound had its pH adjusted to between 3.7–3.9 (bright orange shade) by adding 5% ethanolic sodium hydroxide solution thereto, with an amine compound selected from the group consisting of hydroxylamine, semicarbazide, phenylhydrazine, and nitrophenylhydrazine at a pressure in the range of 50,000 p.s.i. to 150,000 p.s.i. and at a temperature within the range of room temperature to about 250° C. to obtain the corresponding reaction product selected from the group consisting of oximes, semicarbazones, and hydrazones, depending on the amine compound employed in the reaction.

2. The process according to claim 1 wherein the carbonyl compound is selected from the group consisting of 2,2,4,4-tetramethyl-3-pentanone, 2,2,3,3,5,5,6-heptamethyl-4-heptanone, 3,5-dichloro-2,6-dimethyl-1,4-benzoquinone, 2,2',6,6'-tetramethyl benzophenone and 2,2,6,6-tetramethylcyclohexanone.

3. The process according to claim 1 wherein the carbonyl compound is 2,2,4,4-tetramethyl-3-pentanone and the amine compound is hydroxylamine.

4. The process according to claim 3 wherein the reaction is carried out at a pressure between 125,000 p.s.i. and 136,000 p.s.i.

References Cited by the Examiner

FOREIGN PATENTS 598,822   2/1948   Great Britain.

OTHER REFERENCES

Bruzau, Ann. de Chim., 11th Series, vol 1, pages 257–268 (1934).

Fieser et al., "Organic Chemistry," 2nd Ed., pp. 213–214 (1950).

CHARLES B. PARKER, *Primary Examiner.*